(12) United States Patent
Elias et al.

(10) Patent No.: US 10,951,549 B2
(45) Date of Patent: Mar. 16, 2021

(54) REUSING SWITCH PORTS FOR EXTERNAL BUFFER NETWORK

(71) Applicant: MELLANOX TECHNOLOGIES TLV LTD., Raanana (IL)

(72) Inventors: George Elias, Tel Aviv (IL); Gil Levy, Hod Hasharon (IL); Liron Mula, Ramat Gan (IL); Aviv Kfir, Nili (IL); Benny Koren, Zichron Yaakov (IL); Sagi Kuks, Ramat Gan (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 16/294,958

(22) Filed: Mar. 7, 2019

(65) Prior Publication Data

US 2020/0287846 A1    Sep. 10, 2020

(51) Int. Cl.
*H04L 12/861* (2013.01)
*H04L 12/935* (2013.01)

(52) U.S. Cl.
CPC .......... *H04L 49/90* (2013.01); *H04L 49/3018* (2013.01); *H04L 49/3027* (2013.01)

(58) Field of Classification Search
CPC .. H04L 49/90; H04L 49/3018; H04L 49/3027
USPC ........................................................ 370/429
See application file for complete search history.

(56) References Cited

U.S. PATENT DOCUMENTS

| | | | |
|---|---|---|---|
| 5,235,642 A | 10/1993 | Wobber et al. | |
| 5,367,520 A | 11/1994 | Cordell | |
| 5,574,885 A | 11/1996 | Denzel et al. | |
| 5,790,522 A | 8/1998 | Fichou et al. | |
| 5,917,947 A | 6/1999 | Ishida et al. | |
| 6,160,814 A | 12/2000 | Ren et al. | |
| 6,169,748 B1 | 1/2001 | Barbas et al. | |

(Continued)

FOREIGN PATENT DOCUMENTS

| EP | 1698976 A1 | 9/2006 |
|---|---|---|
| WO | 03024033 A1 | 3/2003 |

OTHER PUBLICATIONS

Infiniband Architecture Release 1.2.1, vol. 1, General specifications, Chapter 7.9, pp. 212-216, Nov. 2007.

(Continued)

*Primary Examiner* — Huy D Vu
*Assistant Examiner* — Nizam U Ahmed
(74) *Attorney, Agent, or Firm* — Kligler & Associates Patent Attorneys Ltd

(57) ABSTRACT

An Integrated Circuit (IC) includes multiple ports and packet processing circuitry. The ports are configured to serve as ingress ports and egress ports for receiving and transmitting packets from and to a communication network. The packet processing circuitry is configured to forward the packets between the ingress ports and the egress ports, to read an indication that specifies whether the IC is to operate in an internal buffer configuration or in an off-chip buffer configuration, when the indication specifies the internal buffer configuration, to buffer the packets internally to the IC, and, when the indication specifies the off-chip buffer configuration, to configure one or more of the ports for connecting to a memory system external to the IC, and for buffering at least some of the packets in the memory system, externally to the IC.

14 Claims, 7 Drawing Sheets

(56) References Cited

U.S. PATENT DOCUMENTS

| | | |
|---|---|---|
| 6,324,165 B1 | 11/2001 | Fan et al. |
| 6,347,337 B1 | 2/2002 | Shah et al. |
| 6,456,590 B1 | 11/2002 | Ren et al. |
| 6,490,248 B1 | 12/2002 | Shimojo |
| 6,535,963 B1 | 3/2003 | Rivers |
| 6,539,024 B1 | 3/2003 | Janoska et al. |
| 6,606,666 B1 | 8/2003 | Bell et al. |
| 6,633,395 B1 | 10/2003 | Tuchitoi et al. |
| 6,771,654 B1 | 8/2004 | Sang et al. |
| 6,895,015 B1 | 5/2005 | Chiang et al. |
| 6,922,408 B2 | 7/2005 | Bloch et al. |
| 6,993,032 B1 | 1/2006 | Dammann et al. |
| 7,027,457 B1 | 4/2006 | Chiussi et al. |
| 7,068,822 B2 | 6/2006 | Scott |
| 7,088,713 B2 | 8/2006 | Battle et al. |
| 7,131,125 B2 | 10/2006 | Modelski et al. |
| 7,136,381 B2 | 11/2006 | Battle et al. |
| 7,190,667 B2 | 3/2007 | Susnow et al. |
| 7,327,749 B1 | 2/2008 | Mott |
| 7,334,065 B1 | 2/2008 | Rose et al. |
| 7,590,058 B1 | 9/2009 | Cherchali et al. |
| 7,609,636 B1 | 10/2009 | Mott |
| 7,747,086 B1 | 6/2010 | Hobbs et al. |
| 7,773,622 B2 | 8/2010 | Schmidt et al. |
| 7,853,738 B2 | 12/2010 | Pothireddy et al. |
| 7,856,026 B1 | 12/2010 | Finan et al. |
| 7,924,708 B2 | 4/2011 | Spink |
| 7,936,770 B1 | 5/2011 | Frattura et al. |
| 8,149,710 B2 | 4/2012 | Bergamasco et al. |
| 8,270,295 B2 | 9/2012 | Kendall et al. |
| 8,274,971 B2 | 9/2012 | Battle et al. |
| 8,352,648 B1 | 1/2013 | Puranik |
| 8,478,811 B2 | 7/2013 | Garg et al. |
| 8,635,386 B2 | 1/2014 | Takahashi |
| 8,656,188 B2 | 2/2014 | Goodwill et al. |
| 8,699,491 B2 | 4/2014 | Koren et al. |
| 8,738,860 B1* | 5/2014 | Griffin ............... G06F 13/4022 711/122 |
| 8,923,337 B2 | 12/2014 | Singh |
| 9,130,885 B1 | 9/2015 | Bukspan et al. |
| 9,325,641 B2 | 4/2016 | Haramaty et al. |
| 9,584,429 B2 | 2/2017 | Haramaty et al. |
| 9,742,702 B1 | 8/2017 | Bukspan et al. |
| 2002/0012340 A1 | 1/2002 | Kalkunte et al. |
| 2002/0019916 A1 | 2/2002 | Henrion |
| 2002/0027908 A1 | 3/2002 | Kalkunte et al. |
| 2002/0067695 A1 | 6/2002 | Skarpness et al. |
| 2002/0176432 A1 | 11/2002 | Courtney et al. |
| 2003/0016697 A1 | 1/2003 | Jordan |
| 2003/0043828 A1 | 3/2003 | Wang et al. |
| 2003/0048792 A1 | 3/2003 | Xu et al. |
| 2003/0065812 A1 | 4/2003 | Beier et al. |
| 2003/0076849 A1 | 4/2003 | Morgan et al. |
| 2003/0095560 A1 | 5/2003 | Arita et al. |
| 2003/0117958 A1 | 6/2003 | Nation et al. |
| 2003/0118016 A1 | 6/2003 | Kalkunte et al. |
| 2003/0120894 A1 | 6/2003 | Wang et al. |
| 2003/0123392 A1 | 7/2003 | Ruutu et al. |
| 2003/0137939 A1 | 7/2003 | Dunning et al. |
| 2003/0198231 A1 | 10/2003 | Kalkunte et al. |
| 2003/0198241 A1 | 10/2003 | Putcha et al. |
| 2003/0200330 A1 | 10/2003 | Delke et al. |
| 2003/0222860 A1 | 12/2003 | Yamaura |
| 2003/0223435 A1 | 12/2003 | Gil |
| 2004/0027989 A1 | 2/2004 | Martin et al. |
| 2004/0037558 A1 | 2/2004 | Beshasi |
| 2004/0066785 A1 | 4/2004 | He et al. |
| 2004/0202169 A1 | 10/2004 | Mukouyama et al. |
| 2005/0063370 A1 | 3/2005 | Beshai et al. |
| 2005/0076138 A1 | 4/2005 | Sterne |
| 2005/0125424 A1 | 6/2005 | Herriott et al. |
| 2005/0129033 A1 | 6/2005 | Gordy et al. |
| 2005/0135356 A1* | 6/2005 | Muthukrishnan ....... H04L 47/30 370/389 |
| 2005/0223139 A1 | 10/2005 | Wagh et al. |
| 2005/0259574 A1 | 11/2005 | Figueira et al. |
| 2006/0034172 A1 | 2/2006 | Morton |
| 2006/0092842 A1 | 5/2006 | Beukema et al. |
| 2006/0095609 A1 | 5/2006 | Radhakrishnan et al. |
| 2006/0155938 A1 | 7/2006 | Cummings et al. |
| 2006/0182112 A1 | 8/2006 | Battle et al. |
| 2007/0015525 A1 | 1/2007 | Beming et al. |
| 2007/0019553 A1 | 1/2007 | Sagfors et al. |
| 2007/0025242 A1 | 2/2007 | Tsang |
| 2007/0053350 A1 | 3/2007 | Spink et al. |
| 2007/0274215 A1 | 11/2007 | Gusat et al. |
| 2008/0144670 A1 | 6/2008 | Goossens et al. |
| 2008/0259936 A1 | 10/2008 | Hussain et al. |
| 2009/0003212 A1 | 1/2009 | Kwan et al. |
| 2009/0010162 A1 | 1/2009 | Bergamasco et al. |
| 2009/0161684 A1 | 6/2009 | Voruganti et al. |
| 2009/0182944 A1* | 7/2009 | Comparan .......... G06F 12/0888 711/122 |
| 2010/0057953 A1 | 3/2010 | Kim et al. |
| 2010/0088756 A1 | 4/2010 | Balakrishnan et al. |
| 2010/0100670 A1 | 4/2010 | Jeddeloh |
| 2010/0165842 A1 | 7/2010 | Wang et al. |
| 2010/0325318 A1 | 12/2010 | Desoli et al. |
| 2011/0058571 A1 | 3/2011 | Bloch et al. |
| 2012/0072635 A1 | 3/2012 | Yoshida et al. |
| 2012/0106562 A1 | 5/2012 | Laor et al. |
| 2012/0144064 A1 | 6/2012 | Parker et al. |
| 2013/0212296 A1 | 8/2013 | Goel et al. |
| 2014/0036930 A1 | 2/2014 | Lih et al. |
| 2014/0095745 A1 | 4/2014 | Kawahara |
| 2014/0140206 A1 | 5/2014 | Hendel et al. |
| 2014/0155043 A1 | 6/2014 | Gell et al. |
| 2014/0204742 A1 | 7/2014 | Pandit |
| 2014/0269711 A1 | 9/2014 | Ravid et al. |
| 2014/0286349 A1 | 9/2014 | Kitada |
| 2014/0289568 A1 | 9/2014 | Koyoma et al. |
| 2014/0310354 A1 | 10/2014 | Fountain et al. |
| 2015/0026309 A1 | 1/2015 | Radcliffe et al. |
| 2015/0058857 A1 | 2/2015 | Sandstorm |
| 2015/0095568 A1* | 4/2015 | Lamb .................. G06F 3/0605 711/114 |
| 2015/0103667 A1 | 4/2015 | Elias |
| 2015/0180790 A1 | 6/2015 | Rimmer et al. |
| 2015/0263994 A1* | 9/2015 | Haramaty ............ H04L 47/283 370/412 |
| 2015/0371607 A1* | 12/2015 | Holland .................. G06T 1/20 345/213 |
| 2016/0226951 A1 | 8/2016 | Talpey et al. |

OTHER PUBLICATIONS

Raatikainen, P., "ATM Switches—Switching Technology S38. 3165", Switching Technology, L8—1, 34 pages, year 2006 (http://www.netlab.hut.fi/opetus/s383165).

Fahmy, S., "A Survey of ATM Switching Techniques", Department of Computer and Information Science, The Ohio State University, USA, 22 pages, Aug. 21, 1995 (http://www.cs.purdue.edu/homes/fahmy/cis788.08Q/atmswitch.html).

Minkenberg et al., "Multistage Interconnection Networks for Data Centers; Bidirectional Fat Tree Construction and Routing for IEEE 802.1au", IBM Research GmbH, Zurich, Switzerland, 9 pages, Jul. 2, 2007.

Bwalya et al., "Performance Evaluation of Buffer Size for Access Networks in First Generation Optical Networks", International Journal of Internet of Things, vol. 6, issue 3, pp. 98-105, 2017.

* cited by examiner

REUSING SWITCH PORTS FOR EXTERNAL BUFFER NETWORK

FIELD OF THE INVENTION

The present invention relates generally to communication networks, and particularly to the reuse of network ports as external memory buffers.

BACKGROUND OF THE INVENTION

In communication networks, large buffers may be required, for example, to avoid congestion due to traffic peaks. Use of large buffers in a network switch is described, for example, in "Performance Evaluation of Buffer Size for Access Networks in First Generation Optical Networks," Bwalya and Tembo, International Journal of Internet of Things; 6(3), 2017, pages 98-105, wherein the effects of a large buffer size on the system performance is analyzed.

SUMMARY OF THE INVENTION

An embodiment of the present invention that is described herein provides an Integrated Circuit (IC) including multiple ports and packet processing circuitry. The ports are configured to serve as ingress ports and egress ports for receiving and transmitting packets from and to a communication network. The packet processing circuitry is configured to forward the packets between the ingress ports and the egress ports, to read an indication that specifies whether the IC is to operate in an internal buffer configuration or in an off-chip buffer configuration, when the indication specifies the internal buffer configuration, to buffer the packets internally to the IC, and, when the indication specifies the off-chip buffer configuration, to configure one or more of the ports for connecting to a memory system external to the IC, and for buffering at least some of the packets in the memory system, externally to the IC.

In some embodiments, the packet processing circuitry is configured to configure a same port for communication over the communication network when operating in the internal buffer configuration, and for communicating with the memory system when operating in the off-chip buffer configuration.

In an embodiment, when operating in the off-chip buffer configuration, the packet processing circuitry is configured to buffer, internally to the IC, packets that are directed to egress queues that are longer than a predefined threshold, and to buffer in the memory system, externally to the IC, packets that are directed to egress queues that are shorter than the predefined threshold.

In another embodiment, the memory system includes multiple memory sub-systems, and the packet processing circuitry is configured to distribute the buffered packets among the multiple memory sub-systems. In an example embodiment, the packet processing circuitry is configured to distribute the buffered packets among the multiple memory sub-systems at random.

In yet another embodiment, the packet processing circuitry is configured to prefetch one or more of the packets from the memory system into an internal memory. In an example embodiment, the packet processing circuitry is configured to prefetch the packets out-of-order, and to reorder the prefetched packets in the internal memory.

In still another embodiment, the IC further includes a dual-purpose buffer, and the processing circuitry is configured to store the packets in the dual-purpose buffer when the indication specifies the on-chip buffer configuration, and to store in the dual-purpose buffer both the packets and packet descriptor queues when the indication specifies the off-chip buffer configuration. In an embodiment, the processing circuitry is configured to store at least one of the packet descriptor queues in the memory system external to the IC.

There is additionally provided, in accordance with an embodiment of the present invention, a method including receiving and transmitting packets, from and to a communication network, in an Integrated Circuit (IC) that includes multiple ports configured to serve as ingress ports and egress ports. The packets are forwarded between the ingress ports and the egress ports using circuitry in the IC. An indication, which specifies whether the IC is to operate in an internal buffer configuration or in an off-chip buffer configuration, is read. When the indication specifies the internal buffer configuration, the packets are buffered internally to the IC. When the indication specifies the off-chip buffer configuration, one or more of the ports are configured for connecting to a memory system external to the IC, and for buffering at least some of the packets in the memory system, externally to the IC.

The present invention will be more fully understood from the following detailed description of the embodiments thereof, taken together with the drawings in which:

DETAILED DESCRIPTION OF EMBODIMENTS

Overview

Figure 1:
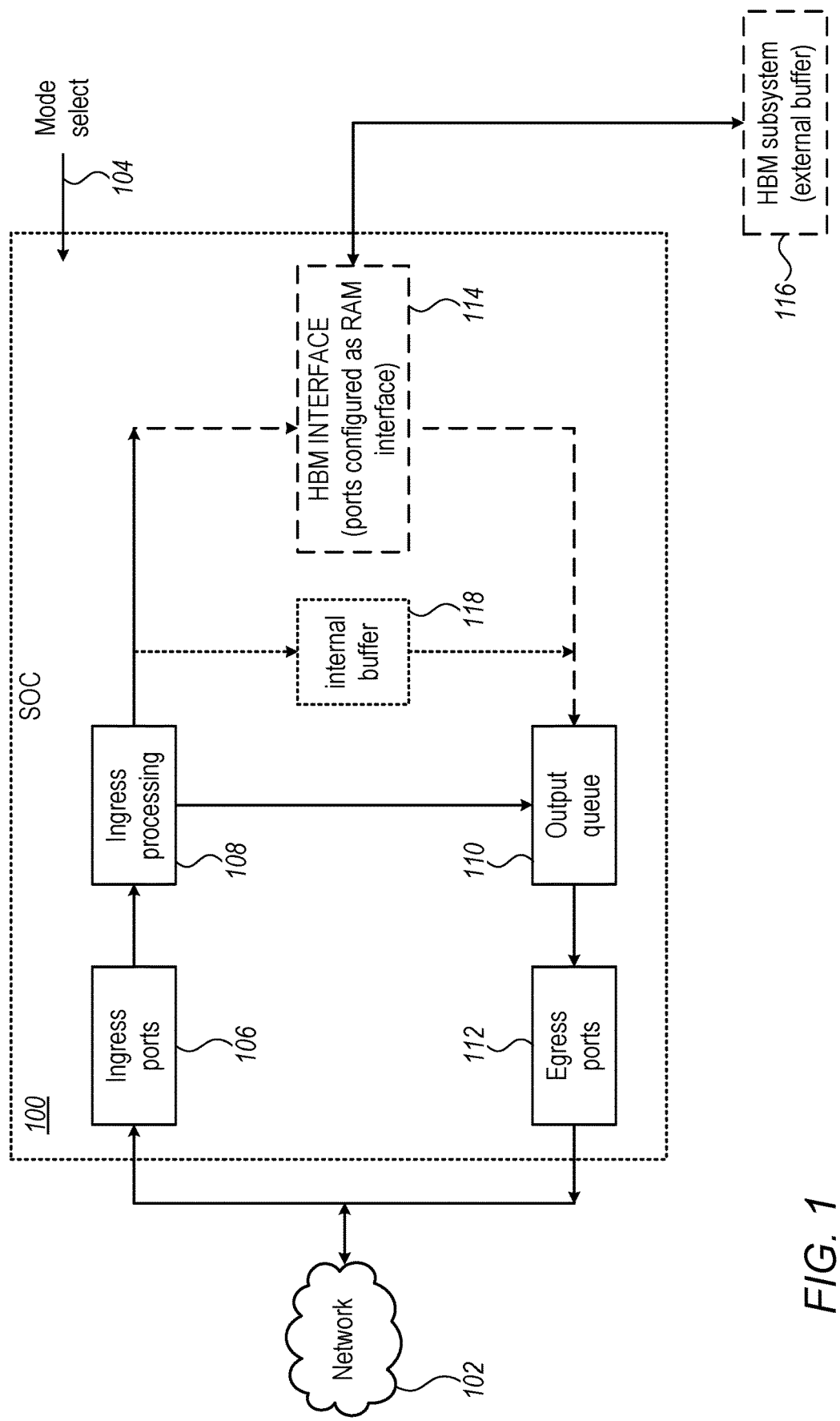
FIG. 1 is a block diagram that schematically illustrates the data-path in a System on Silicon (SOC), in accordance with embodiments of the present invention.

Network switches typically comprise buffers for storing network traffic being processed. In practice, the required size of the buffers may vary according to the application. In some applications the size may reach more than 64 Mega-Byte (MB), and the buffer is stored in dedicated memory integrated circuits.

In example embodiments according to the present invention, a network switch comprises a System on Silicon (SOC), which sends and receives network packets. Buffers for storing intermediate bursts may be implemented in the SOC when the buffers are small (typically up to 32 MB); however, storing buffers of larger sizes in the SOC may be undesirable and, at some point (e.g. 64 MB), impractical.

The disclosed SOC can be programmed (or otherwise set, as will be described hereinbelow) to one of at least two different configurations: An On-Chip-Buffer configuration, and an External-Buffer configuration. In the on-chip buffer configuration, the SoC stores all packets in its internal memory. In the off-chip buffer configuration, one or more of the ports of the network switch are configured to connect to a memory system external to the SoC, and the SoC may store at least some of the packets in this external memory system. In some embodiments, for applications requiring a small buffer size (e.g., less than 32 MB) the SOC may be programmed to the On-Chip-Buffer configuration; whereas for applications requiring large buffers (e.g., in excess of 32 MB) the SOC may be programmed to the External-Buffer configuration.

We will refer hereinbelow to the SOC in singular form, although switches according to embodiments of the present invention may comprise a plurality of SOC devices. In embodiments, the SOC comprises one or more processors, network ports and various hardware elements such as classifiers, caches, queues, queue management logic etc.

Thus, according to embodiments, the same SOC device may be used in at least two type of systems—Small-Buffer-Size systems, wherein all data buffers are stored in the SOC, and Large-Buffer-Size systems, wherein at least some of the buffer is stored in integrated circuits that are external to the SOC.

According to an embodiment of the present invention, in Large-Buffer-Size systems, the large buffers are stored in one or more High Bandwidth Memory (HBM) subsystems that are coupled to egress ports of the SOC. Each HBM subsystem comprises HBM and interface logic, wherein the interface logic is configured to translate network port accesses to memory accesses. When the SOC is in External-Buffer configuration, the SOC routes at least some of the packets that need to be buffered to output ports that are coupled to the HBM subsystems, reads packets from the HBM subsystems, and sends the packets, through egress ports, to the network.

In an embodiment according to the present invention, when the SOC is programmed to the External-Buffer configuration, the SOC compares the length of the queue to which the packet is directed to a preprogrammed threshold. The SOC will then store the packets internally if the queue-length does not exceed the threshold, and send the packets to the HBM subsystems if the queue-length does exceed the threshold.

In some embodiments, the SOC reads the selected configuration from hardware that is external to the SOC—for example, from a serial flash device (typically with other configuration parameters, such as the threshold value) or, in another example, from an SOC pad that may be wired to logic-1 or logic-0. In other embodiments the configuration is programmed by software (or firmware).

When sending packets to off-SOC storage, it is desirable to spread the packets evenly between the HBM subsystems. According to some embodiments of the present invention, the SOC selects the HBM subsystem randomly, to statistically minimize the variance of the load of the HBM subsystems. Alternatively, any other suitable selection scheme can be used.

In embodiments of the present invention, if the system is not congested, incoming packets directed at loaded queues will be sent to queues of egress ports that are coupled to HBM subsystems with small delay. However, when an Egress port needs to read a packet from an HBM subsystem, it may collide with other egress ports that attempt to read data from the same HBM subsystem. Embodiments of the present invention that are provided herein comprise a prefetch mechanism to mitigate the penalty of such collisions. Egress ports that read buffers from HBM subsystems request to read the data before it is needed, and, save the data in a queue. When the prefetch mechanism fetches data from several HBM subsystems, data may be returned out-of-order; the prefetch mechanism then reorders the data in the queue.

According to an embodiment of the present invention, additional packet descriptors that may be needed when the SOC is set to the external buffer configuration are stored in external memory, which may be an HBM subsystem or a separate memory device.

According to alternative embodiments, the additional packets descriptors are stored in the SOC; in an embodiment, the internal buffer is configured to store packet buffers when the SOC is set to the external-buffer configuration.

System Description

FIG. 1 is a block diagram that schematically illustrates the data-path in an SOC, in accordance with embodiments of the present invention.

An SOC 100 is configured to receive and send packets from/to a Network 102. The SOC comprises Ingress Ports 106, which are configured to receive packets from the network; Ingress Processing circuitry 108, which is configured to process and temporarily store input packets; an Output Queue 110, which is configured to temporarily store output packets; and, Egress Ports 112, which are configured to send packets to Network 102.

SOC 100 has at least two selectable configurations—On-Chip-Buffer Configuration, typically used in applications wherein small buffers (e.g., less than 32 MB) are needed, and, External Buffer Configuration, for applications that require larger buffers. According to the example embodiment of FIG. 1, the configuration is set by a Mode input port 104 of the SOC. In alternative embodiments the configuration may be set by other means, for example, by software programming.

When SOC 100 is set to the External Buffer configuration, the SOC sends at least some of the input packets from the Input Queue to a High Bandwidth Memory (HBM) Interface 114, which comprises network egress and ingress ports. The HBM Interface sends and receive packets to/from an external buffer stored in an HBM Subsystem 116, which is external to the SOC (when SOC 100 is set to the Internal Buffer configuration, the packets are stored in an Internal Buffer 118).

The HBM subsystem comprises HBM memory and a network interface. HBM interface 114 communicates with the HBM subsystem using the same network communication protocol that Ingress Ports 106 and Egress Ports 112 use to communicate with the network. The HBM Subsystems translates the protocol to RAM access protocol, to access the HBM Subsystems memory.

HBM Interface 114 is a virtual unit in the sense that it does not comprise any dedicated data-path elements. When SOC 100 is set to the External Buffer configuration, some (or all) of the network ports are configured as HBM interface; when the SOC is set to On-Chip-Buffer configuration, the same ports may be configured to communicate with the network. In applications that require a small buffer size (e.g., less than 32 MB), SOC 100 is set to the On-Chip Buffer configuration; HBM subsystem 116 is not used, and all the ports of the SOC may be connected to the network.

Thus, according to the example embodiment of FIG. 1, the same SOC may be used in two different systems—a system wherein all buffers are stored in the SOC, and systems wherein HBM subsystems store at least some of the larger buffers.

As would be appreciated, the structure of SOC 102 described above is cited by way of example. SOCs in accordance to the disclosed techniques are not limited to the description hereinabove. In alternative embodiments the SOC may comprise, for example, a plurality of SOC integrated circuits. In an embodiment the functions if the SOC described hereinabove are implemented in a Printed Circuit Board (PCB), which comprises a plurality of components, and the HBM subsystem is mounted on a different module that can be plugged into the PCB, connected to the PCB through a dedicated bus, or, connected through a shared bus. In some embodiments, the HBM subsystem is replaced by other storage media, including but not limited to DDR RAM modules, and hard disks.

Figure 2:
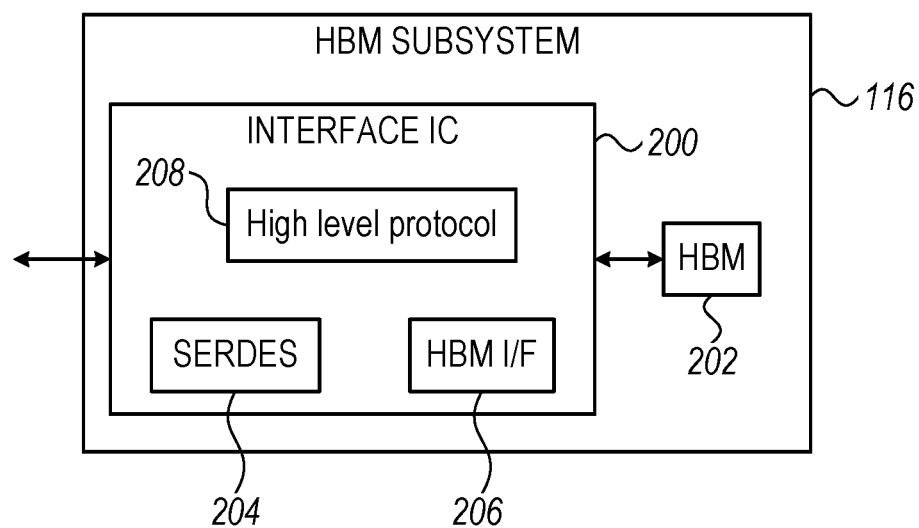
FIG. 2 is a block diagram that schematically illustrates a High Bandwidth Memory (HBM) subsystem, in accordance with an embodiment of the present invention.

FIG. 2 is a block diagram that schematically illustrates HBM subsystem 116 (FIG. 1), in accordance with an embodiment of the present invention. The HBM subsystem comprises HBM memory (typically comprising a plurality of memory integrated circuits), and an interface integrated circuit (Interface IC) 200. In a typical embodiment, HBM subsystem 116 is implemented as an interposer, on which the integrated circuits of HBM 202 and Interface IC 200 are mounted.

The function of Interface IC 200 is to translate the network protocol used by ingress and egress ports to HBM access protocol. Interface IC 200 comprises a Serializer/De-seriallizer (SERDES) 204, an HBM Interface 206, and a high-level-protocol unit 208.

SERDES 204 sends and receives packets to/from the SOC, whereas HBM Interface 206 implements the low-level HBM interface protocol (e.g., sending address; sending and receiving data). High Level Protocol unit 208 manages operations requests (reads and writes) according to their priority and may support returning responses by order. In addition, the High-Level Protocol may handle memory related functionalities like supporting of a sequence of read or writes, memory allocation or others. In some embodiments, High Level Protocol unit 208 also comprises physical layer handling.

The structure of HBM subsystem 102, as described in the example embodiment of FIG. 2, is similar to the structure of high performance HBM memory modules that are used in the industry. The addition of the relatively small Interface IC 200 allows accessing the HBM subsystem using network protocol.

As would be appreciated, the structure of HBM Subsystem 116 described above is cited by way of example. Memory subsystems of the disclosed techniques are not limited to the description hereinabove. In alternative embodiments, HBM subsystem 116 may comprise other types of memory; may be integrated for example, on a PCB rather than an interposer. In some embodiments, high-level protocol unit 208 may be embedded in HBM Interface 208, or, eliminated altogether.

Figure 3:
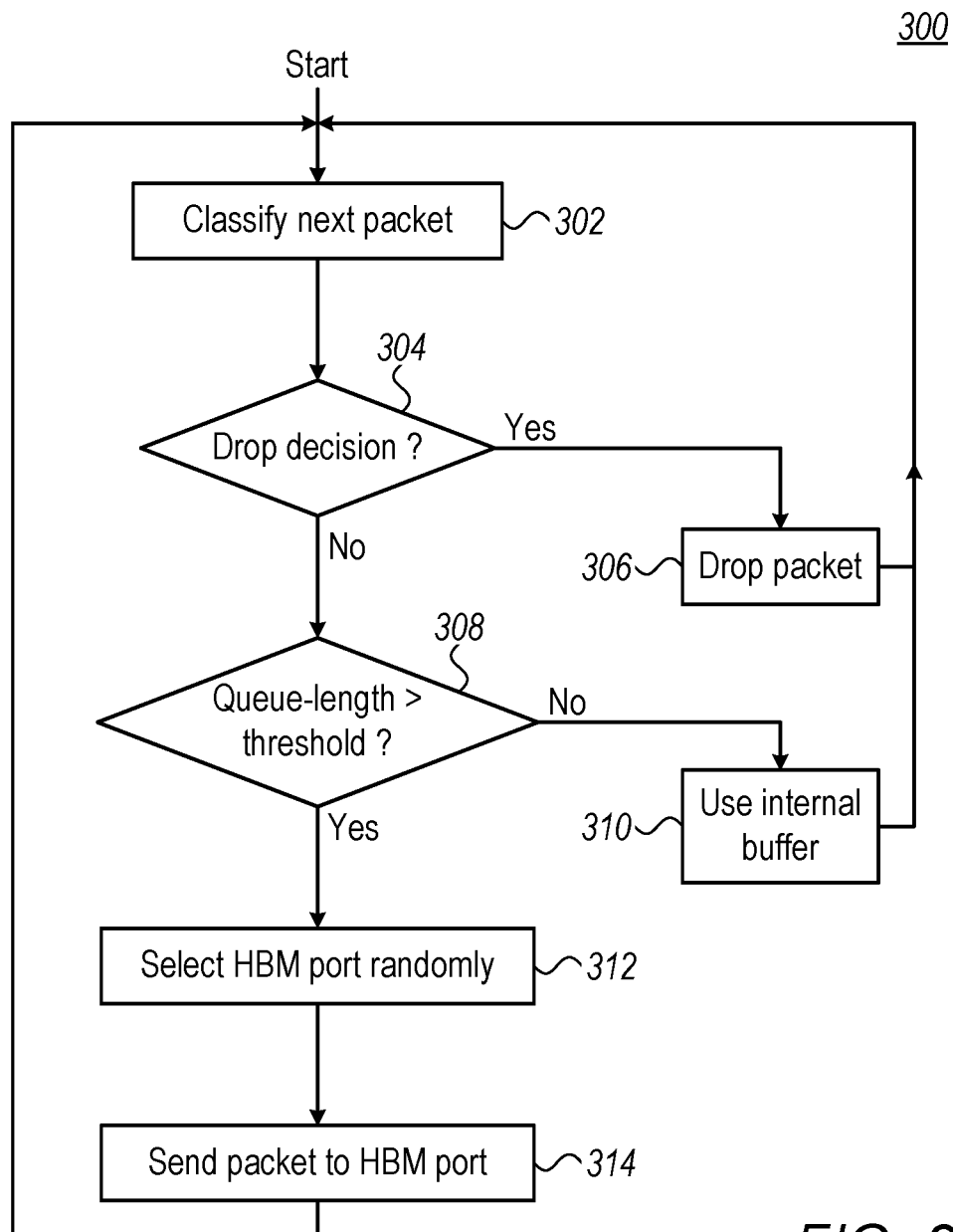
FIG. 3 is a flow chart that schematically illustrates handling of an ingress packet in a SOC, in accordance with an embodiment of the present invention.

FIG. 3 is a flow chart 300 that schematically illustrates handling of an ingress packet in an SOC, in accordance with an embodiment of the present invention. The flow is executed by SOC 100.

The flow starts at a Classifying Next Packet step 302, wherein the SOC classifies the next packet from an input queue in ingress processing circuitry 108 (FIG. 1), and, enters a Dropping-Decision step 304. If the SOC decides to drop the packet, the SOC will next enter a Dropping Packet step 206, drop the packet, and return to Step 302, to classify the next packet. The SOC may decide to drop the packet for a variety of reasons; e.g. insufficient permissions, or network congestion.

If, at step 304, the SOC decides not to drop the packet, the SOC enters a Comparing Queue-Length step 308; wherein the SOC compares the length of the queue to which the packet is directed, to a threshold. The SOC decides to store the packet in memory that is embedded in the SOC if the length of the queue to which the packet is directed is not larger than the threshold, or, to store the packet in external buffer memory otherwise. The threshold may be preprogrammed by software, or decided according to a configuration input of the SOC. In some embodiments the threshold may change dynamically; for example, according to the amount of unallocated external buffer space.

If, at step 308, the packet is not larger than the threshold, The SOC enters a Using Internal Buffer step 310, wherein the packet is stored in the SOC. The SOC will then return to Step 302, to classify the next packet.

If, in step 308, the length of the queue to which the packet is directed is larger than the threshold, the packet will be stored in external buffer; the will enter a Selecting HBM step 312, wherein one of the available ports that are coupled to HBM subsystems will be selected. In some embodiments, the selection will be done randomly, so that the load of the external buffers will yield, statistically, the lowest variance.

After step 312, the SOC enters a Sending Packet to HBM Port step 314, wherein the SOC sends the packet to HBM Interface 114 (FIG. 1)—that is—to a port that is coupled to an external HBM subsystem. The SOC will then return to Step 302, to classify the next packet.

Thus, according to the example flow-chart illustrated in FIG. 3, the SOC classifies incoming packets, sending packets that are directed to shorter queues to internal buffers, and sending the other packets, through ports that are configured as an HBM interface, to external HBM subsystems. In applications that require small buffers only, HBM subsystems are not used, the SOC is set to On-Chip Buffer configuration, wherein all the ports can be used as network ports.

As would be appreciated, flowchart 300 described above is cited by way of example. Memory subsystems in accordance with the disclosed techniques are not limited to the description hereinabove. In alternative embodiments, some of or all the steps of flowchart 300 may be executed at the same cycle, or in a different order. In some embodiments the flow-chart is executed by microcode; in other embodiments the flow-chart may be executed by software, by hardware, or by a combination of hardware and software.

Figure 4:
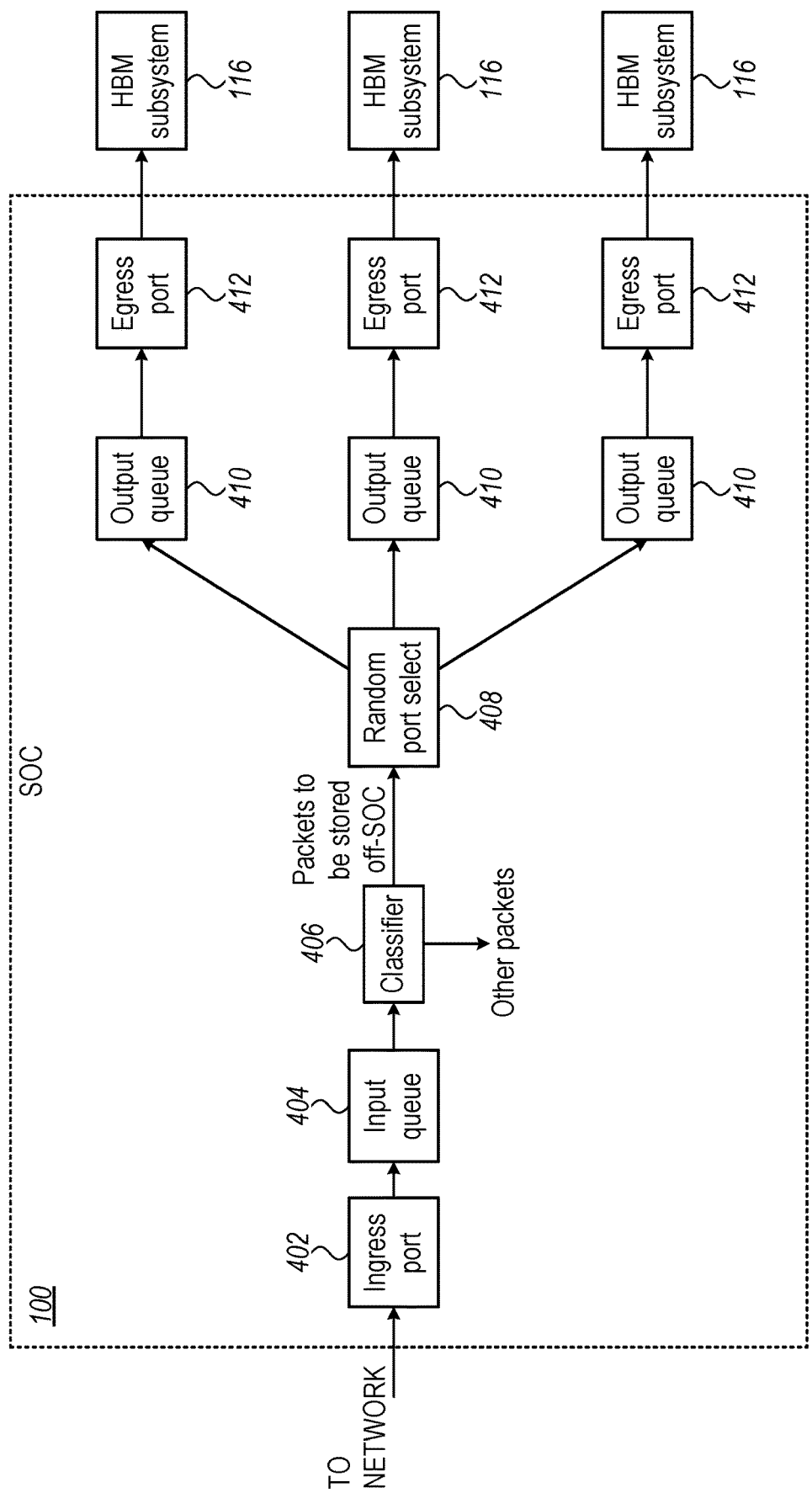
FIG. 4 is a block diagram that schematically illustrates the data path of packets in the SOC, from the network to the HBM subsystems, according to an embodiment of the present invention.

FIG. 4 is a block diagram that schematically illustrates the data path of packets in the SOC, from the network to the HBM subsystems, according to an embodiment of the present invention (ports which are not connected to HBM subsystems are excluded from the figure). An Ingress Port 402 receives packets from the network, and, forwards the packets to an Input Queue 404, which stores the packets temporarily. A Classifier 406 inspects the headers of the packets. The classifier may drop some of the packets (not shown), and, send other packets to various destinations.

If the SOC is set to the External Buffer configuration, at least some of the packets will be temporarily stored in an external HBM subsystem. The classifier will send such packets to a Random Port Select unit 408. The classifier will send the other packets (or all packets if the SOC is set to the On-Chip Buffer configuration), to one or more internal buffers within the SOC.

Random Port Select unit 408 selects, for each packet, an HBM subsystem that is not full (or has an output queue smaller than a preset threshold). The selection is done randomly, to minimize the odds that a single HBM subsystem will overflow. Random Port Select 408 then sends the packet to one of three Output Queues 412, according to the random selection. Output queues 412 are configured to temporarily store packets, and, forward the packets to Egress Ports 412.

Egress Ports 412 are coupled to HBM subsystems 116. The egress ports are configured to send packets to the HBM subsystem in the same way they send data to the network. The HBM subsystems are configured to translate the network protocol to HBM accesses, and to manage the HBM storage.

Thus, according to the embodiment described in FIG. 4, packets that the SOC receives from the network may be sent to internal buffers (queues), or, to egress ports that are coupled to external HBM subsystems. The SOC decides where to send the packets according to its configuration and according to the length of the destination queue. Packets that are stored in external buffer are output from the SOC through egress ports that are coupled to HBM subsystems external to the SOC. The HBM subsystem translates the network protocol used by the egress ports to HBM accesses. The same SOC can be used in systems with and without HBM subsystems.

As would be appreciated, the network-to-external-memory data path described with reference to FIG. 4 above, is cited by way of example. Data paths of the disclosed techniques are not limited to the description hereinabove. For example, in alternative embodiments, the classifier may send all packets to an internal buffer, and, if the SOC is set to the external buffer configuration, the classifier may send all packets to external buffers.

Although the example configuration of FIG. 4 comprises one Ingress port 402, one input queue 404, three output queues 410, three Egress ports 412 and three HBM subsystems, alternative embodiments are not limited, and can have any suitable number of the said units.

In some embodiments, the selection of the HBM subsystem is done by prioritizing HBM subsystems according to the amount of unused storage. In other embodiments the selection of the HBM subsystem is done with respect to the unused storage, the size of the HBM egress queue and the size of the packet, and in yet other embodiments the classifier uses random selection with an uneven distribution that is respective to the size of the unused storage and/or the packet size. In some embodiments the random selection comprises, in addition to the selection of the HBM subsystem, selection of an HBM subsystem port.

Prefetching

According to embodiments of the present invention described hereinabove, the odds for a congestion when an HBM subsystem is written are low, as incoming packets may be directed to free HBM subsystems. However, when an Egress port needs to read a buffer from an HBM subsystem, it may collide with other egress ports that attempt to read the same HBM subsystem. Therefore, although HBM memories typically have the same read and write throughput, bottlenecks may occur on the path from the HBM subsystems to the egress ports. To overcome this potential problem, embodiments according to the present invention comprise prefetch logic, wherein the egress port requests to read data from the HBM subsystems before the data is needed. Data is stored in an output queue (that is typically a part of the on-chip buffer), and the egress port will read data from the queue. The egress port will send output packets with no interruption as long as there are unread packets in the prefetch queue. This may be achieved if average bandwidth from the HBM towards this queue is higher from the required output bandwidth.

Figure 5:
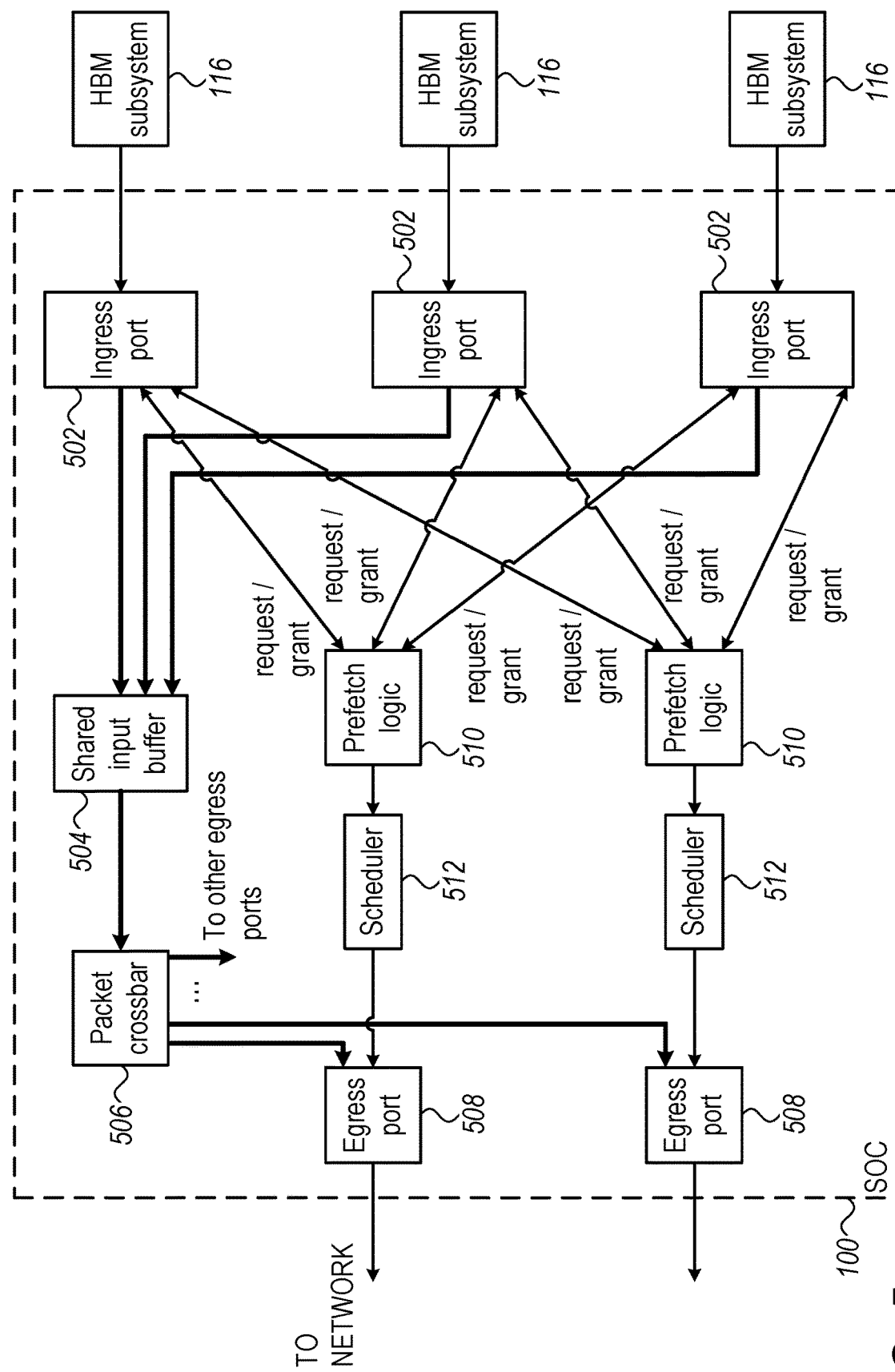
FIG. 5 is a high-level block diagram that schematically illustrates the data path of packets in the SOC, from the HBM subsystems to the egress ports, according to an embodiment of the present invention.

FIG. 5 is a high-level block diagram that schematically illustrates the data path of packets in the SOC, from the HBM subsystems to the egress ports, according to an embodiment of the present invention.

SOC 100 is set to the External Buffer configuration, wherein packets are temporarily stored in buffers within HBM subsystems 116. The SOC data-path comprises Ingress Ports 502, which are configured as HBM interface, Shared Input Buffer 504, which is configured to temporarily store ingress packets; Packet Crossbar 506; and, Egress Ports 508; wherein the Packet Crossbar is configured to transfer packets from the shared input buffers to the egress ports.

The SOC control path comprises Prefetch Logic units 510, and Schedulers 512. Prefetch Logic units 510 are configured to request data from the HBM subsystems through Ingress ports 502 and receive an acknowledge indication from the Ingress Ports when the data is ready. As the latency time from a request to get data until data arrives may be long (relative to the packet data rate), the prefetch logic units request data from the HBM subsystems prior to the time that the data is needed by the Egress ports.

Each of prefetch logic units 510 may request data from several Ingress Ports 502, and, may issue several requests (and receive several grants) before Ingress ports 502 return data associated with the first request. As a result, data may be received out-of-order (OOO), and the shared input buffer is configured to rearrange input data so that data in the shared input buffer will be ordered.

Thus, according to the example configuration of FIG. 5, large buffers that are stored in HBM subsystems external to the SOC, are read into prefetch buffers prior to the time that the egress ports need the buffers. This arrangement minimizes the odds that data that an egress buffer needs will not be available on die due to congestion of requests to get data from the HBM subsystems.

As would be appreciated, the HBM-subsystems to Egress-ports data path described with reference to FIG. 5 above, is cited by way of example. Data paths of the disclosed techniques are not limited to the description hereinabove. For example, groups of egress ports may share the same prefetch buffer, and groups of prefetch buffers may share the same prefetch logic unit. The quantities if units depicted in FIG. 5, such as two Egress Ports, two Prefetch Buffers, two Prefetch Logic Units, three Ingress Ports and three HBM subsystems are cited by way of example and for the sake of clarity—any other suitable number can be used in alternative embodiments.

Figure 6:
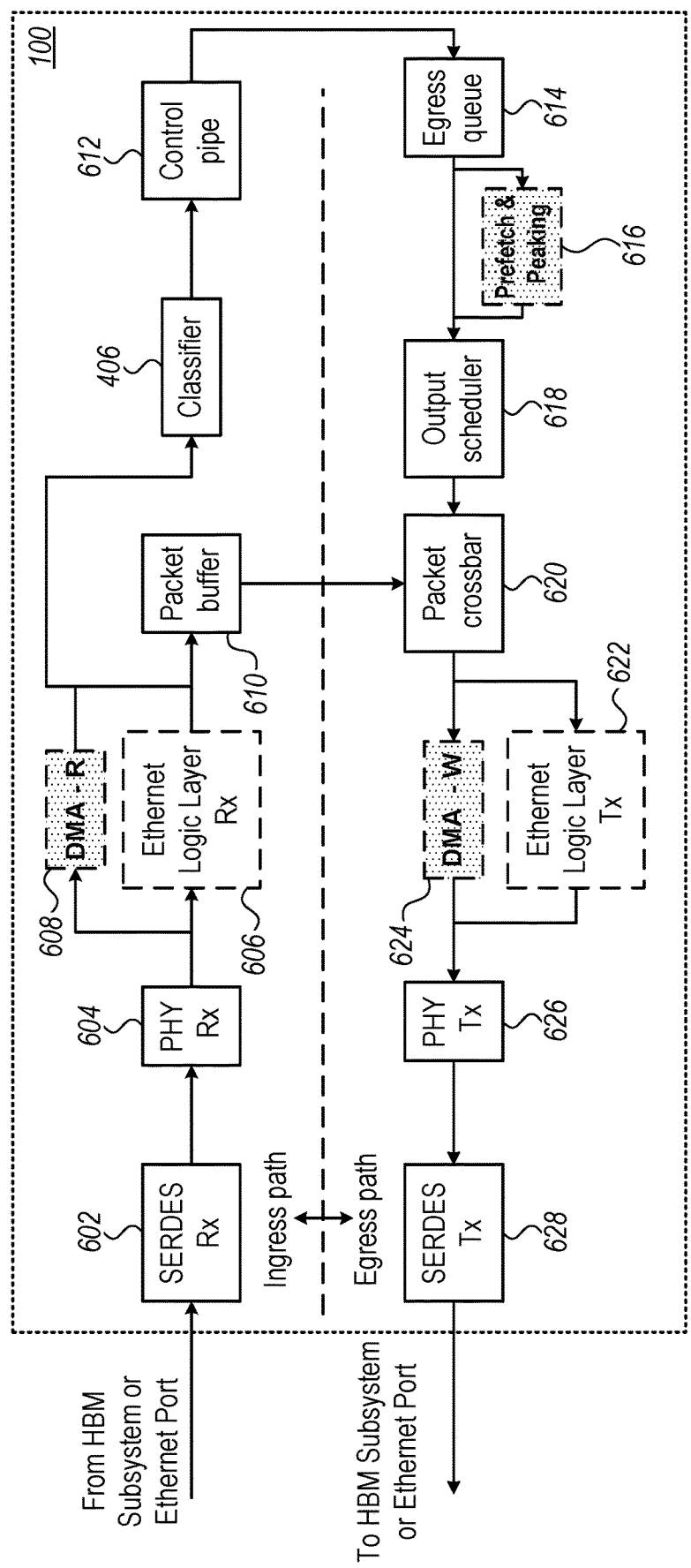
FIG. 6 is a block diagram that schematically illustrates the data path elements in the SOC, according to an embodiment of the present invention.

FIG. 6 is a block diagram that schematically illustrates the data path elements in SOC 100, according to an embodiment of the present invention. The data path elements can be divided to Ingress path (top row of elements in FIG. 6) and Egress path (bottom row). Data-path, with reference to the block diagram of FIG. 6, includes both packets and packet descriptors.

Data Path elements of the Ingress Path comprise a SERDES Rx 602, which is configured to convert serial data from either an Ethernet port or an HBM subsystem; a PHY-Rx 604, which is configured to implement the PHY level of the Ethernet protocol; an Ethernet Logic Layer 606, which is configured to implement the logic level of the Ethernet Rx protocol, (and may not be used when the corresponding Ingress port is coupled to an HBM subsystem); a Direct-Memory-Access (DMA) Read unit 608, which is configured to generate DMA read cycles in the HBM subsystems and forward data from the PHY-Rx to the next stage (DMA-Read 608 is used only when the corresponding Ingress port is coupled to an HBM subsystem); a Packet Buffer 610, which is configured to store input packets; Classifier 406 (FIG. 4), which is configured to classify the packets and generate packet descriptors, (which includes target-queue indication, drop indication and on-die/HBM storage indication); and, a Control Pipe 612, which is configured to store descriptors of ingress packets, and distribute the packets descriptors to Egress Queues.

Data path elements of the Egress Path comprise an Egress Queue 614, which is configured to temporarily store packet descriptors of the Egress flows; a Prefetch and Peaking 616, which is configured to prefetch data from the Egress Queue (and is bypassed if the corresponding ingress port is not coupled to an HBM subsystem); an Output Scheduler 618, which is configured to schedule the handling of packet descriptors from egress queue 614; a Packet Crossbar 620, which is configured to extract packets from packet buffer 610; an Ethernet-Logic-Layer-Tx 622, which is configured to implement the logic level of the Ethernet Tx protocol, (and is not used when the corresponding Egress port is coupled to an HBM subsystem); a DMA-W 624, which is configured to generate DMA-write cycles within the HBM subsystem that is coupled to the corresponding Egress port (and, which is used only if the corresponding Egress port is coupled to an HBM subsystem); a PHY-Tx 626, which is configured to implement the PHY-Tx level of the Ethernet protocol; and, a SERDES Tx 628, which is configured to convert parallel data to serial, and send the data to either an Ethernet port or to an HBM subsystem.

The flow of data in the data-path units that are described above with reference to FIG. 6, will be described hereinbelow, with reference to FIG. 7.

Figure 7:
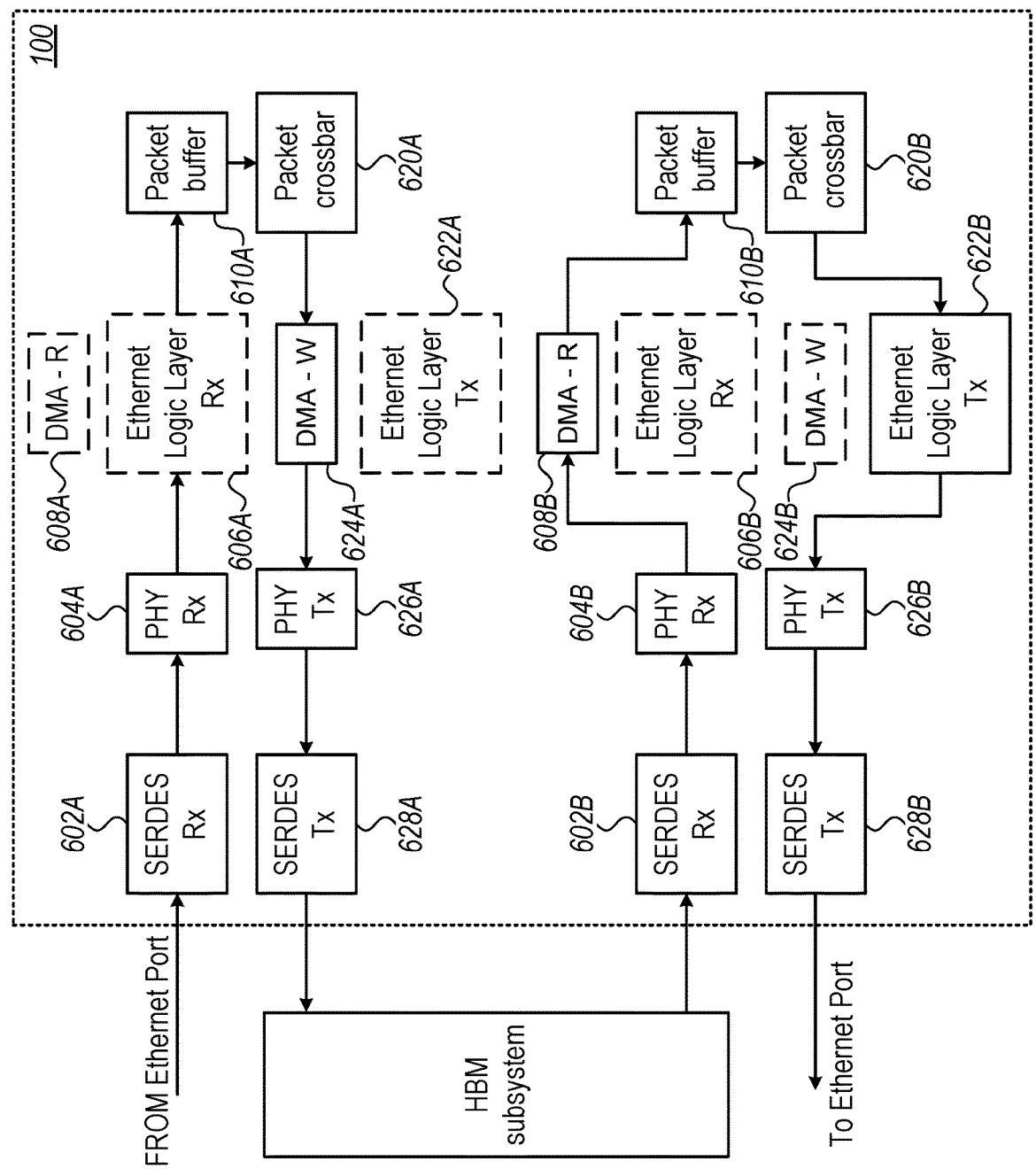
FIG. 7 is a block diagram that schematically illustrates the data path flow of packets, from ingress ports, through an HBM subsystem, and to an egress port, according to an embodiment of the present invention.

FIG. 7 is a block diagram that schematically illustrates the data path flow of packets, from ingress ports, through an HBM subsystem, and to an egress port, according to an embodiment of the present invention.

A packet that requires buffering (external or internal) arrives from the Ethernet to SOC 100, through a first SERDES Rx 602A. The SERDES Rx 602A converts the packet to a parallel representation, and forwards the packet to a first PHY-Rx 604A, which implement the PHY-Rx level of the Ethernet protocol, and forwards the packet to a first Ethernet Logic Layer unit 606A (a First DMA-R Unit 608A is not used, because the First SERDES 602A is coupled to an Ethernet port rather than to an HBM subsystem).

The First Ethernet Logic Layer 606A implements the logic level of the Ethernet Rx protocol, and sends the packet to a First Packet Buffer 610A.

A First Packer Crossbar retrieves a packet from First Packet Buffer 610A, and, forwards the packet to a First DMA-Write 624A (A First Ethernet Logic Layer Tx 622A is not in use, because the packet's destination is an HBM subsystem rather than an Ethernet port).

First DMA-Write 624A generates DMA-write cycles within the HBM subsystem that is coupled to the corresponding Egress port, and sends the packets to a First PHY-Tx 626A, which implements the PHY-Tx level of the Ethernet protocol, and forwards the packet to a First SERDES Tx 628A, which converts parallel data to serial, and sends the data to an HBM subsystem 116, external to SOC 100.

The path from the HBM subsystem to the Egress port starts with a Second SERDES-Rx 602B, which converts the packet from the HBM subsystem to a parallel representation, and forwards the packet to a second PHY-Rx 604B, which implements the PHY-Rx level of the Ethernet protocol (as described hereinabove, the PHY level of the protocol of packets from the HBM subsystem is also Ethernet protocol), and forwards the packet to a DMA-R Unit 608B. (Second Ethernet Logic Layer unit 606B is not used, because the Second SERDES 602B is coupled to an HBM subsystem rather than to an Ethernet port).

DMA-R unit 608B handles reads from the HBM subsystem, and, forwards the packet to a Second Packet Buffer 610B.

A Second Packet Crossbar 620B retrieves packets from Second Packet Buffer 610B, and, forwards the packets to a Second Ethernet Logic Layer Tx 622B (a Second DMA-Write 624B is not in use, because the packets' destination is an Ethernet port rather than an HBM subsystem).

Second Ethernet Tx Logic Layer 622B implements the logic level of the Ethernet protocol, and forwards the packets to a Second PHY Tx 626B, which implements the PHY-Tx level of the Ethernet protocol, and, forwards the packet to a Second SERDES Tx 628B. Lastly, Second SERDES Tx 628B converts parallel data to serial, and sends the data to the Ethernet port.

Thus, according to the example embodiment of FIGS. 6 and 7, the same SOC that is used in applications that do not require an external buffer can be configured to support external buffers that are mounted on HBM subsystems. When the SOC is used in applications that require an external buffer, packets propagate from Ethernet Ingress ports to Egress ports that are coupled to HBM subsystems, and, from HBM subsystems, through Ingress ports that are coupled to the HBM subsystems, to Ethernet Egress ports.

As would be appreciated, the data path and the data path elements of SOC 100, described with reference to FIGS. 6 and 7, are cited by way of example. Data paths of the disclosed techniques are not limited to the description hereinabove. For example, in some embodiments packet buffer 610 may be a shared resource, common to all or to some of the ingress ports; In other embodiments, Classifier 406 may be a shared resource. In some embodiments, packet descriptors may travel with the data rather than in a separate path.

Packet Descriptors

Packet descriptors provide packet indications, which comprise the type of the packets, whether or not the packet should be dropped, destination queue, and others. The number of packet descriptors required by an SOC is set with respect to the ratio Buffer-size/average-packet-size. When the buffer size increases, the number of packet descriptors should increase proportionally. However, when off-SOC buffers with sizes that are larger than the on-chip buffer by orders of magnitude are used, increasing the number of packet descriptors in the SOC in the same proportion may be undesirable, and, in extreme cases, impractical. For example, if the internal buffer size is 32 MB and the number of packet descriptors for the On-Chip buffer configuration is 16K, the number of descriptors for an external buffer configuration with a 2 GB HBM buffer should grow to 32 M.

In embodiments according to the present invention, the number of packets descriptors that are stored in the SOC is larger than the number required for On-Chip buffer configuration, but not in proportion to the ratio of the sizes of the external and the internal buffers. This embodiment may have good performance if the average packet size increases in applications wherein large buffers are needed. In other cases, the performance may be limited by the number of packets that are stored in the buffer at the same time.

In an alternative embodiment, when the SOC is in the external buffer configuration, some (or all) of the packet descriptors are stored in the HBM subsystems; and the ratio of buffer size to number of descriptors is kept. The SOC comprises additional logic circuitry to support queuing system that comprises on-chip and off-chip packet descriptors.

In other embodiments, an additional Random-Access Memory (RAM) integrated circuit is used when the SOC is in the external buffer configuration. The SOC will store some or all the descriptors in the RAM. Similarly to the previously described embodiment, the SOC comprises additional logic circuitry to support queuing system that comprises on-chip and off-chip packet descriptors (but, when the descriptors are in a dedicated RAM, typically with shorter latency, the logic may be simpler).

In yet other embodiments, when the SOC is set to the External Buffer configuration, Packet Buffer 610 is configured to allocate some of its storage space to packet descriptors. The packet buffer may be smaller in external-buffer configuration as most of the buffer is in HBM subsystems external to the SOC, so that the allocation of part of the packet buffer to store packet descriptors will not degrade the performance.

Thus, in some embodiments the internal on-chip buffer is a dual-purpose buffer. In the on-chip configuration, the internal buffer is used for storing packets. In the off-chip configuration, the internal buffer is used for storing both packets and packet descriptor queues. In some embodiments, in the off-chip configuration, processing circuitry 108, decides, per packet, whether to drop the packet from the dual-purpose buffer.

The configuration of SOC 100, of HBM subsystem 116, including all units thereof and including flow-chart 300, shown in FIGS. 1 through 7, are example configurations that are shown purely for the sake of conceptual clarity. Any other suitable configurations can be used in alternative embodiments. For example, SOC 100 may be an aggregation of a plurality of integrated circuits, a multi-chip-carrier or a PCB. HBM subsystem 116 may be a single integrated circuit, a multi-chip-carrier or a PCB (rather than an interposer). Ports of SOC 100 may be bidirectional. The various units of SOC 100 may be implemented by hardware, by software, or by combination of hardware and software. SOC 100 may be a Field-Programmable-Gate-Array (FPGA), an Application Specific Integrated Circuit (ASIC), or a combination of FPGA and ASIC.

Moreover, the disclosed techniques can be implemented in any other suitable IC, not necessarily an SOC. In the context of the present patent application and in the claims, all the circuitry of the SOC (or other IC) excluding the ports is referred to herein as "packet processing circuitry." The packet processing circuitry implementations shown in FIGS. 1 and 4-7 are depicted purely by way of example. Any other configuration can be used in alternative embodiments.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Integrated Circuit (IC), comprising:
   multiple ports, configured to serve as ingress ports and egress ports for receiving and transmitting packets from and to a communication network; and
   packet processing circuitry, configured to:
      forward the packets between the ingress ports and the egress ports;
      read an indication that specifies whether the IC is to operate in an internal buffer configuration or in an off-chip buffer configuration;
      when the indication specifies the internal buffer configuration, buffer the packets internally to the IC; and
      when the indication specifies the off-chip buffer configuration, configure one or more of the ports for connecting to a memory system external to the IC, and for buffering at least some of the packets in the memory system, externally to the IC,
   wherein the packet processing circuitry is configured to configure a same port for communication over the communication network when operating in the internal buffer configuration, and for communicating with the memory system when operating in the off-chip buffer configuration;
   and the IC further comprises a dual-purpose buffer, and wherein the processing circuitry is configured to store the packets in the dual-purpose buffer when the indication specifies the on-chip buffer configuration, and to store in the dual-purpose buffer both the packets and packet descriptor queues when the indication specifies the off-chip buffer configuration.

2. The IC according to claim 1, wherein, when operating in the off-chip buffer configuration, the packet processing circuitry is configured to buffer, internally to the IC, packets that are directed to egress queues that are longer than a predefined threshold, and to buffer in the memory system, externally to the IC, packets that are directed to egress queues that are shorter than the predefined threshold.

3. The IC according to claim 1, wherein the memory system comprises multiple memory sub-systems, and wherein the packet processing circuitry is configured to distribute the buffered packets among the multiple memory sub-systems.

4. The IC according to claim 3, wherein the packet processing circuitry is configured to distribute the buffered packets among the multiple memory sub-systems at random.

5. The IC according to claim 1, wherein the packet processing circuitry is configured to prefetch one or more of the packets from the memory system into an internal memory.

6. The IC according to claim 5, wherein the packet processing circuitry is configured to prefetch the packets out-of-order, and to reorder the prefetched packets in the internal memory.

7. The IC according to claim 1, wherein the processing circuitry is further configured to store at least one of the packet descriptor queues in the memory system external to the IC.

8. A method, comprising:
   receiving and transmitting packets, from and to a communication network, in an Integrated Circuit (IC) that includes multiple ports configured to serve as ingress ports and egress ports; and
   using circuitry in the IC:
   forwarding the packets between the ingress ports and the egress ports;
   reading an indication that specifies whether the IC is to operate in an internal buffer configuration or in an off-chip buffer configuration;
   when the indication specifies the internal buffer configuration, buffering the packets internally to the IC; and
   when the indication specifies the off-chip buffer configuration, configuring one or more of the ports for connecting to a memory system external to the IC, and for buffering at least some of the packets in the memory system, externally to the IC,
   wherein configuring the ports comprises configuring a same port for communication over the communication network when operating in the internal buffer configuration, and for communicating with the memory system when operating in the off-chip buffer configuration,
   and the IC further comprises a dual-purpose buffer, and wherein buffering the packets comprises storing the packets in the dual-purpose buffer when the indication specifies the on-chip buffer configuration, and storing in the dual-purpose buffer both the packets and packet descriptor queues when the indication specifies the off-chip buffer configuration.

9. The method according to claim 8, and comprising, when operating in the off-chip buffer configuration, buffering internally to the IC packets that are directed to egress queues that are longer than a predefined threshold, and buffering in the memory system, externally to the IC, packets that are directed to egress queues that are shorter than the predefined threshold.

10. The method according to claim 8, wherein the memory system comprises multiple memory sub-systems, and comprising distributing the buffered packets among the multiple memory sub-systems.

11. The method according to claim 10, wherein distributing the buffered packets comprises distributing the buffered packets among the multiple memory sub-systems at random.

12. The method according to claim 8, and comprising prefetching one or more of the packets from the memory system into an internal memory.

13. The method according to claim 12, wherein prefetching the packets comprises prefetching the packets out-of-order, and reordering the prefetched packets in the internal memory.

14. The method according to claim 8, further comprising storing at least one of the packet descriptor queues in the memory system external to the IC.

* * * * *